US012795426B2

(12) United States Patent
Sabouri-Sichani et al.

(10) Patent No.: US 12,795,426 B2
(45) Date of Patent: Nov. 10, 2026

(54) EXPEDITED MEASUREMENT REPORTING (XMR)

(71) Applicant: Nokia Technologies Oy, Espoo (FI)

(72) Inventors: Faranaz Sabouri-Sichani, Aalborg (DK); Lars Dalsgaard, Oulu (FI); Tero Henttonen, Espoo (FI); Ahmed Farhan Hanif, Nozay (FR); Elena VIrtej, Espoo (FI)

(73) Assignee: Nokia Technologies OY, Espoo (FI)

( * ) Notice: Subject to any disclaimer, the term of this patent is extended or adjusted under 35 U.S.C. 154(b) by 269 days.

(21) Appl. No.: 18/567,313

(22) PCT Filed: Jun. 10, 2022

(86) PCT No.: PCT/EP2022/065820
§ 371 (c)(1),
(2) Date: Dec. 5, 2023

(87) PCT Pub. No.: WO2022/263314
PCT Pub. Date: Dec. 22, 2022

(65) Prior Publication Data

US 2024/0276271 A1 Aug. 15, 2024

Related U.S. Application Data

(60) Provisional application No. 63/212,195, filed on Jun. 18, 2021.

(51) Int. Cl.
*H04W 24/10* (2009.01)

(52) U.S. Cl.
CPC .................................. *H04W 24/10* (2013.01)

(58) Field of Classification Search
CPC .................................................... H04W 24/10
See application file for complete search history.

(56) References Cited

FOREIGN PATENT DOCUMENTS

| | | | |
|---|---|---|---|
| WO | 2019/158811 | A1 | 8/2019 |
| WO | 2020/147771 | A1 | 7/2020 |
| WO | 2020/165866 | A1 | 8/2020 |

(Continued)

OTHER PUBLICATIONS

"3rd Generation Partnership Project; Technical Specification Group Radio Access Network; Evolved Universal Terrestrial Radio Access (E-UTRA) and NR; Multi connectivity; Stage 2 (Release 16)", 3GPP TS 37.340, V16.5.0, Mar. 2021, pp. 1-84.

(Continued)

*Primary Examiner* — Natasha W Cosme
(74) *Attorney, Agent, or Firm* — Lippes Mathias LLP

(57) ABSTRACT

A method and an apparatus according to the present invention comprises receiving a configuration for expedited measurement reporting. The configuration provides an indication to a user equipment to perform measurements related to an expedited measurement reporting carrier or cell as part of connection setup procedure and/or for a period of time while the user equipment is in connected mode. The user equipment performs the measurement and provides the measurement result to the expedited measurement reporting carrier or cell. This allows a network to configure a user equipment to continue measurements on one or more carriers during the connection setup and potentially also during a period of time while in connected mode.

20 Claims, 10 Drawing Sheets

(56) References Cited

FOREIGN PATENT DOCUMENTS

| | | | | | |
|---|---|---|---|---|---|
| WO | WO-2020180226 | A1 | * | 9/2020 | ............ H04W 24/08 |
| WO | WO-2020251443 | A1 | * | 12/2020 | ........ H04W 52/0225 |
| WO | 2022/263956 | A1 | | 12/2022 | |

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Radio Access Network; NR; User Equipment (UE) procedures in Idle mode and RRC Inactive state (Release 16)", 3GPP TS 38.304, V16.4.0, Mar. 2021, pp. 1-39.

"3rd Generation Partnership Project; Technical Specification Group Radio Access Network; NR; Requirements for support of radio resource management (Release 17)", 3GPP TS 38.133, V17.1.0, Mar. 2021, 2172 pages.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.4.0, Mar. 2021, pp. 1-1087.

"3rd Generation Partnership Project; Technical Specification Group Radio Access Network; Evolved Universal Terrestrial Radio Access (E-UTRA); Requirements for support of radio resource management (Release 17)", 3GPP TS 36.133, V17.1.0, Mar. 2021, Part1, Part2, Part3, Part4, 3887 pages.

"Msc-generator", Sourceforge, Retrieved on Dec. 11, 2023, Webpage available at : https://sourceforge.net/projects/msc-generator/.

"Small Data Transmission Enhancements for Rel-18", RAN Rel-18 Workshop, RWS-210080, Jun. 28-Jul. 2, 2021, 11 pages.

"Email discussion [105#53] [LTE_NR_DC_CA_enh-Core] Early measurements Signaling", 3GPP TSG-RAN WG2 Meeting #105bis, R2-1904553, Agenda item: 11.10.3, Ericsson, Apr. 8-12, 2019, pp. 1-35.

International Search Report and Written Opinion received for corresponding Patent Cooperation Treaty Application No. PCT/EP2022/065820, dated Oct. 6, 2022, 16 pages.

"Multi-RAT Dual-Connectivity and Carrier Aggregation enhancements (LTE, NR)", 3GPP TSG RAN meeting #92-e, RP-211148, Agenda item: 9.2.4, Ericsson, Jun. 14-18, 2021, pp. 1-65.

* cited by examiner

EXPEDITED MEASUREMENT REPORTING (XMR)

RELATED APPLICATION

This application claims priority to PCT Application No. PCT/EP2022/065820, filed on Jun. 10, 2022, which claims priority to U.S. Provisional Application No. 63/212,195, filed on Jun. 18, 2021, each of which is incorporated herein by reference in its entirety.

TECHNICAL FIELD

The examples and non-limiting embodiments relate generally to communications and, more particularly, to expedited measurement reporting (XMR).

BACKGROUND

It is known to implement carrier aggregation and/or dual connectivity in a communication network.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
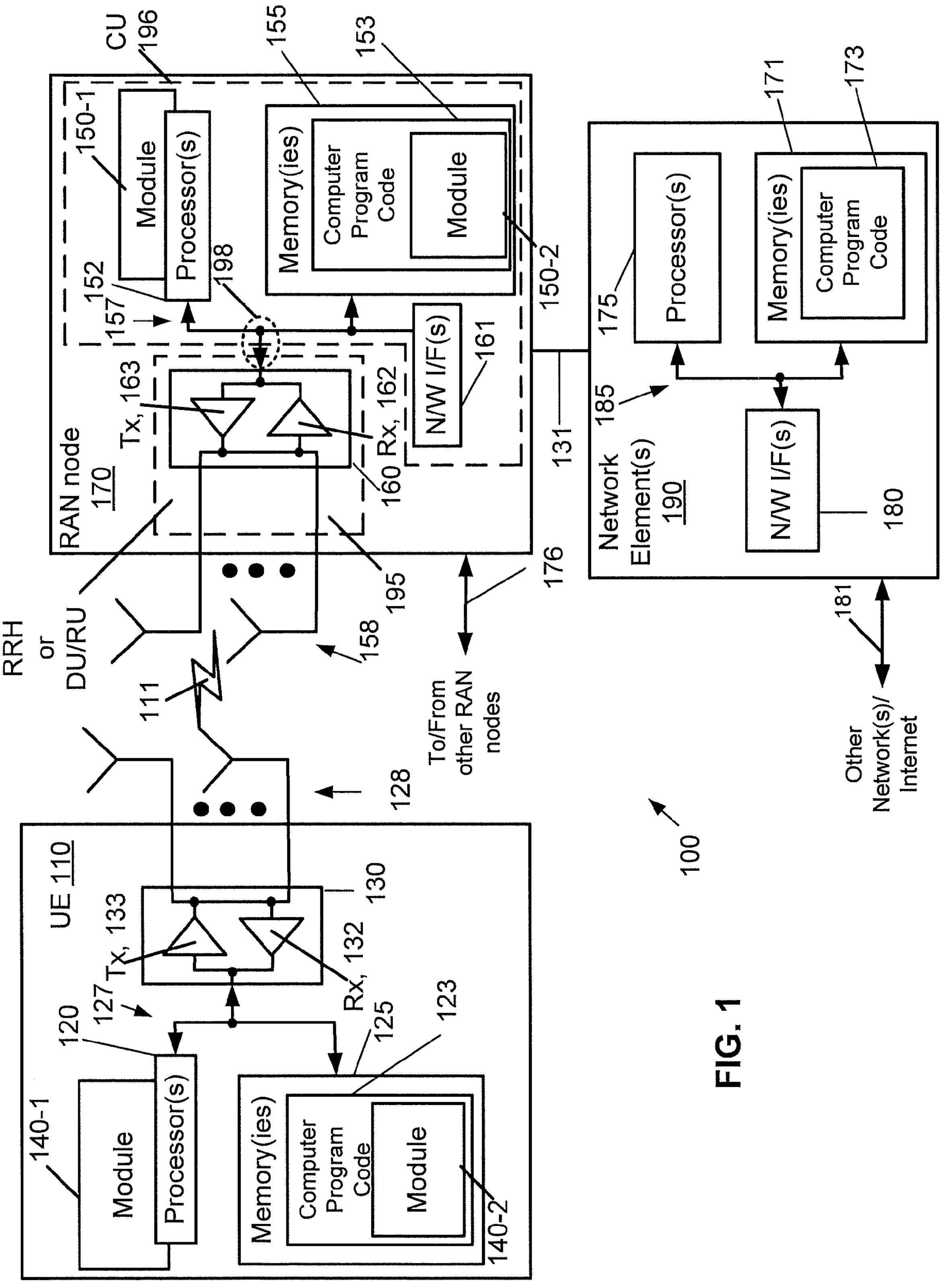
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with PAN node 170 via a wireless link 111.

The PAN node 170 in this example is a base station that provides access by wireless devices such as the UE 110 to the wireless network 100. The PAN node 170 may be, for example, a base station for 5G, also called New Radio (NR). In 5G, the PAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the PAN node 170 and centralized elements of the PAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under PAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The PAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The PAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that the description herein indicates that “cells” perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station’s coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMFF(S)) and/or user plane functions (UPF(s)) and/or session management function(s) (SMF(s)). Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, PAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions.

UE 110, RAN node 170, and/or network element(s) 190, (and associated memories, computer program code and modules) may be configured to implement (e.g. in part) the methods described herein, including expedited measurement reporting (XMR). Thus, computer program code 123, module 140-1, module 140-2, and other elements/features shown in FIG. 1 of UE 110 may implement user equipment related aspects of the methods described herein. Similarly, computer program code 153, module 150-1, module 150-2, and other elements/features shown in FIG. 1 of PAN node 170 may implement gNB/TRP related aspects of the methods described herein. Computer program code 173 and other elements/features shown in FIG. 1 of network element(s) 190 may be configured to implement network element related aspects of the methods described herein.

Having thus introduced a suitable but non-limiting technical context for the practice of the example embodiments, the example embodiments are now described with greater specificity.

The examples described herein relate to Early Measurement Reporting (EMR) and Carrier Aggregation (CA) and/or Dual Connectivity (DC), but could be used also in similar technologies or features as well. Some optimizations were introduced in LTE Rel-15 and LTE/NR Rel-16 to reduce the delay in CA/DC setup by performing early measurements during RRC_IDLE/RRC_INACTIVE, which are then reported to the network at the early phase of the connection. For IDLE mode measurements some UEs may not be capable to perform beam based measurements since these may require additional activity time from the UE and therefore cause higher power consumption to the UE. Therefore, the inventors propose a new method where the network configures the UE to continue to perform measurements (which may additionally include beam based measurements) on one or more carriers during the connection setup and potentially continue these measurements during a period of time while in connected mode. CA or DC are examples of features used for illustrating the method, and the method can be applied also to other technologies or features as well. In the following Idle mode and FR2 are used as examples, while they should not be considered as limiting examples. The method can also be applied otherwise, e.g. for mode like e.g. inactive mode and other frequency ranges like e.g. FR1.

IDLE mode measurements in FR2 leads to long cell detection and measurement delay in general and also when Early Measurement Reporting (EMR) is used for FR2, causing a negative impact on EMR. For FR2, the Carrier Aggregation (CA) and/or Dual Connectivity (DC) setup delay is even more critical. Due to the nature of FR2 (higher carrier frequency) more (frequent) measurements are likely to be needed due to the short range and propagation conditions and smaller cells in FR2. Hence, the radio conditions may change more rapidly.

Thus, the examples described herein relate to configuring by the network a UE to continue to perform measurements on one or more carriers during the connection setup and/or while in connected mode. The examples described herein further relate to indicating by the network to the UE to measure one or more carriers as part of connection setup procedure and/or while in connected mode.

The described method can enable UEs that are not be capable to perform beam based measurements in IDLE or inactive mode to additionally perform those measurements at least during the connection setup procedure.

CA/DC Setup

Figure 2:
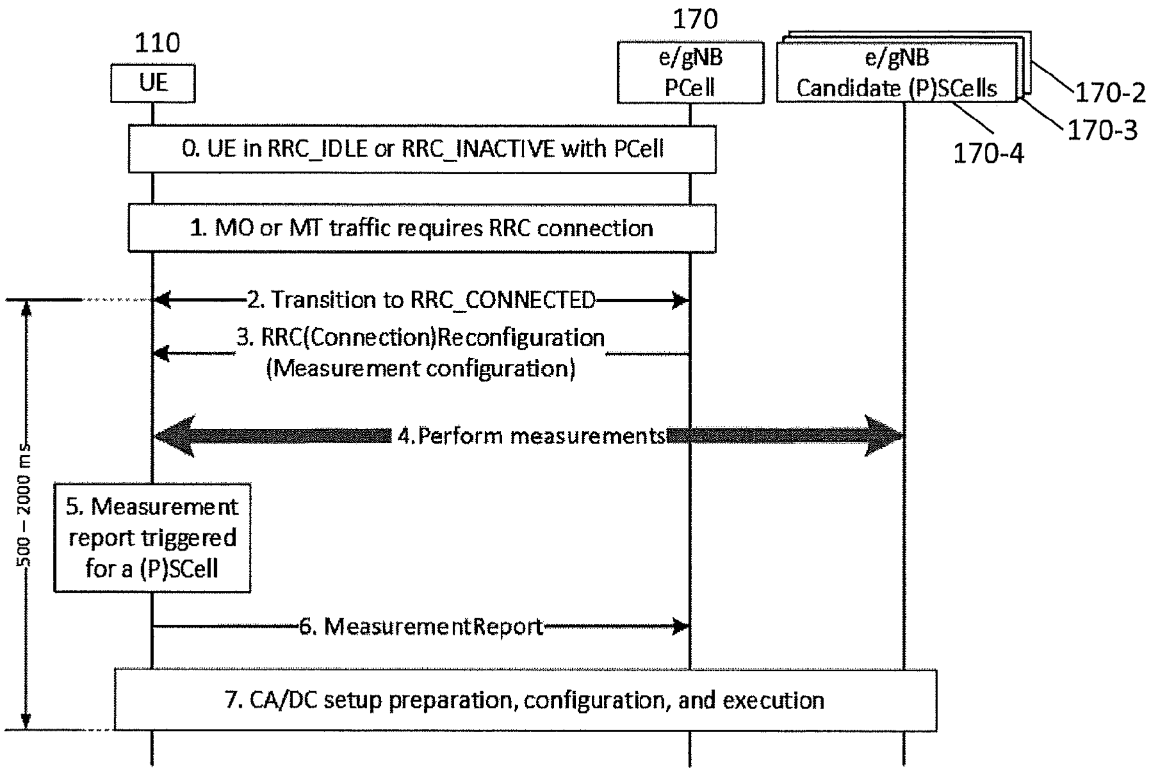
FIG. 2 shows a CA/DC measurements and setup procedure in Release 15.

Carrier aggregation (CA) and/or dual connectivity (DC) was introduced to allow higher peak data rates and to offload UE's traffic to more cells by adding more carriers as secondary cells (SCell) or primary secondary cells (PSCell) in CA and DC, respectively. FIG. 2 illustrates the signaling for offloading UE's traffic to a (P)SCell including measurement configuration and reporting (as per LTE/NR Release 15 functionality). Thus FIG. 2 shows signaling between the UE 110, e/gNB PCell 170, and the e/gNB candidate (P)SCells 170-2, 170-3, and 170-4.

The following can be observed from FIG. 2 (1-4 immediately below):

1. Measurement configuration is transmitted to the UE in for example RRC(Connection)Reconfiguration message after the UE has entered RRC_CONNECTED state in PCell. This configuration needs to include the (P)SCell target carrier and other relevant configurations that UE needs for performing the measurements (e.g. gaps, SMTC, frequency information, reporting events, etc.).

2. The UE then performs inter-frequency measurements and report the potential target (P)SCells' measured results periodically or according to triggered event(s).

3. There is some latency due to RRC messaging/configuration (i.e. first performing the inter-frequency measurements, reporting the results to network, network configuring the (P)SCell and finally the SCell activation), but the largest part of the delay comes from the inter-frequency measurements (which includes cell detection and after that, performing the cell measurement), measurement event triggering and subsequent measurement reporting.

4. In case the PCell and candidate (P)SCells are co-located, network knows whether that it could configure CA or DC blindly (i.e. without receiving measurement results), but this is often not feasible for non-collocated scenarios or inter-site cells as neither the UE nor the NW may not know which (if any) candidate PSCell or SCell to configure, so doing that easily wastes resources and incur extra power consumption for both UE and network.

Figure 3:
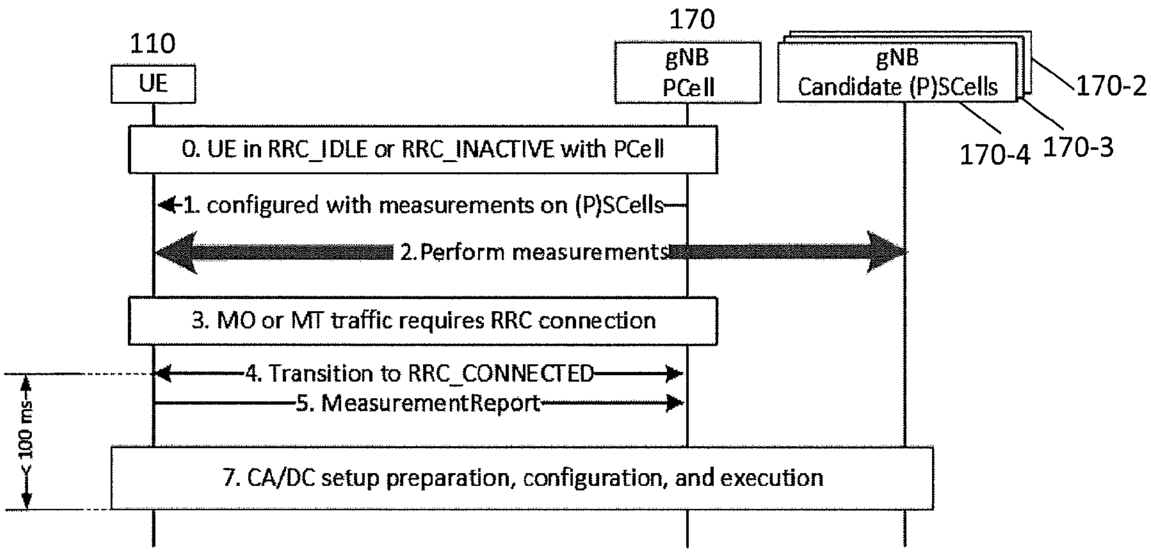
FIG. 3 shows a CA/DC early measurements and setup procedure in Release 16.

Some optimizations were introduced in LTE Rel-15 and LTE/NR Rel-16 to reduce the delay in CA/DC setup by performing early measurements during RRC_IDLE/RRC_INACTIVE, which are then reported to the network at the early phase of the connection. FIG. 3 illustrates the message signaling sequence related to this change.

The following can be observed from FIG. 3 (1-5 immediately below):

1. Measurements on candidate (P)SCells are configured to be performed when the UE is in RRC_IDLE/RRC_INACTIVE.

2. This configuration could be for example broadcasted (e.g. SIB4/SIB11) or sent to specific UE in an RRC message (e.g. RRC(Connection)Release) or be combined from both items of information (i.e. UE uses measurement configuration from broadcast based on the indication it received in the RRC message).

3. The UE then performs indicated measurements on a configured carrier and cells (e.g. possible target (P)SCells) while in RRC_IDLE/RRC_INACTIVE.

4. When the UE transitions to RRC_CONNECTED the measurements can be transmitted to the NW in for example RRC(Connection)SetupComplete or in RRC message right after connection setup is completed (depending on if UE comes from INACTIVE or IDLE).

5. This approach can reduce the setup time significantly down to e.g. approximately 100 ms.

Measurements

In RRC_CONNECTED the UE shall derive cell measurement results by measuring one or multiple cells where each measurement is collected per SSB. Measurements may be reported including SSB Index if configured by the network. For IDLE mode measurements it is a UE capability whether it can perform beam based measurements or not. Hence, some UE may be able to measure (and potentially report)

beam based IDLE mode measurements and others may not. The network may also configure the UE to report measurement information per beam [38.331, 5.5.3.1]

Use of idle/inactive mode measurements including EMR measurements on FR2 cells is important for low latency and is as such included in Rel-16. However, the requirements of IDLE mode measurements in FR2 are very relaxed, which leads to long cell detection and measurement delay in general and also when EMR is used for FR2. Such delay may of course have negative impact on EMR as it may not allow reliable performance improvement in all cases.

For FR2, the CA/DC setup delay is even more critical because Rel-15 FR2 measurement requirements are quite relaxed and allow for long UE latencies without stringent timing and accuracy requirements. One reason for this is to allow reasonable power saving opportunities while UE is in IDLE mode.

Rel-15/16 EMR mechanism improves the overall CA/DC setup delay, but at the possible cost of UE having to do beam level measurements for UE which support this. For other UEs (not supporting IDLE mode beam-based measurements) there is no or very small additional measurement impact due to EMR.

Two aspects are still to be addressed related to existing EMR and reporting of idle mode measurements, which are: 1) Due to the nature of FR2 carriers (which are carriers operating at high frequency ranges larger than 24.25 GHz) more (frequent) measurements are likely needed due to the short range and propagation conditions, use of beam forming and smaller cell sizes in FR2. Hence, the radio conditions the UE observes may change more rapidly than in FR1 carriers (which cover the frequency ranges lower than 6 GHz) and accurate measurements are particularly needed for moving UEs where both the UE speed and the radio environment itself vary; 2) Not all UEs support beam level measurements in IDLE/INACTIVE mode (as the UE capability idleInactiveNR-MeasBeamReport-r16 is optional). A UE which does not support beam level measurements in IDLE or inactive mode is not required to be able to report beam level measurement results or beam Index information but may only report the SSB-RSRP value.

There is a need to address these two open aspects and further enhance the existing Rel-16 EMR principle to enable enhanced reporting of measurements performed by the UE.

The following specifications captured the Rel-15 and Rel-16 procedures and requirements for UE early measurement reporting in LTE and NR: LTE: 36.331, 36.133; NR: 38.331, 38.133. The EMR mechanism in Rel-16 is intended for IDLE/INACTIVE mode, but nothing is specified when the connection setup has been initiated.

To address the mentioned problems, the herein described ideas are developed, as illustrated in a new method, which may be called "Expedited Measurement Reporting" or "XMR". A method is described in which the network can configure the UE to continue measurements on one or more carriers during the connection setup and potentially during a period of time while in connected mode. This includes indicating UE to perform additional measurements during connection setup according to provided configuration, which can be extended part of EMR configuration or provided separately via dedicated or broadcast signaling. Optionally, this can also allow UE to select which carrier(s) to measure and a time limit for the measurements.

The network may indicate to the UE to measure one or more carriers as part of connection setup procedure. The network indication may be provided via one or more of the following alternatives: i) before the connection setup (e.g. via system information, paging message or stored configuration, or RRC(Connection)Release), ii) during the connection setup (e.g. as part of PAR, or depending on cell where the connection is established), iii) via the connection setup message (e.g. as part of RRCSetup—message or stored RRC configuration that is resumed).

The following alternatives are provided for the measured carrier selection. At least one or more of the mentioned alternatives may be applied (including a combination of one or more of them): i) the network configures UE via a 1-bit flag that indicates whether UE performs additional measurements during and/or after connection setup according to provided configuration. ii) network indicates one or more EMR carriers (e.g. if UE is EMR capable and is configured with EMR) and/or or one or more carriers on which the UE is required to perform XMR as part of the EMR configuration or as separate configurations (i.e. one or more carriers configured for EMR, one or more carriers configured for XMR). iii) Based on the network indicating the UE to perform additional measurements during and/or after connection setup, the UE selects the (FR2) carrier on which to continue the measurements during connection setup. Such selection can be based on UE measurement availability or other UE autonomous selection method.

The following alternatives are provided for measurement reporting. Even though the different embodiments can be applied independently a combination of different alternatives cannot be excluded: i) The UE reports the measurement results based on both EMR and one-sample XMR measurement on selected carrier(s) done during connection setup or connected (e.g. a connected mode or connected state). ii) The XMR results can be reported to the network either with existing EMR reporting (if measurements are ready) or they can be reported at a later point once ready using any measurement reporting method. iii) The UE reports the measurement results based on both selected idle mode measurements and one-sample measurement on selected carrier(s) done during connection setup or connected (e.g. a connected mode or connected state).

This example method further enables the UE to perform beam level measurements on a detected cell which may not have been performed in idle or inactive mode e.g. due to UE capability (UE cannot perform such beam level measurements) or UE was not configured to perform such measurements. This is because the UE is doing the measurements while transitioning to CONNECTED mode, which can be handled in the same way as CONNECTED, where the beam level measurements are mandatory.

Figure 4:
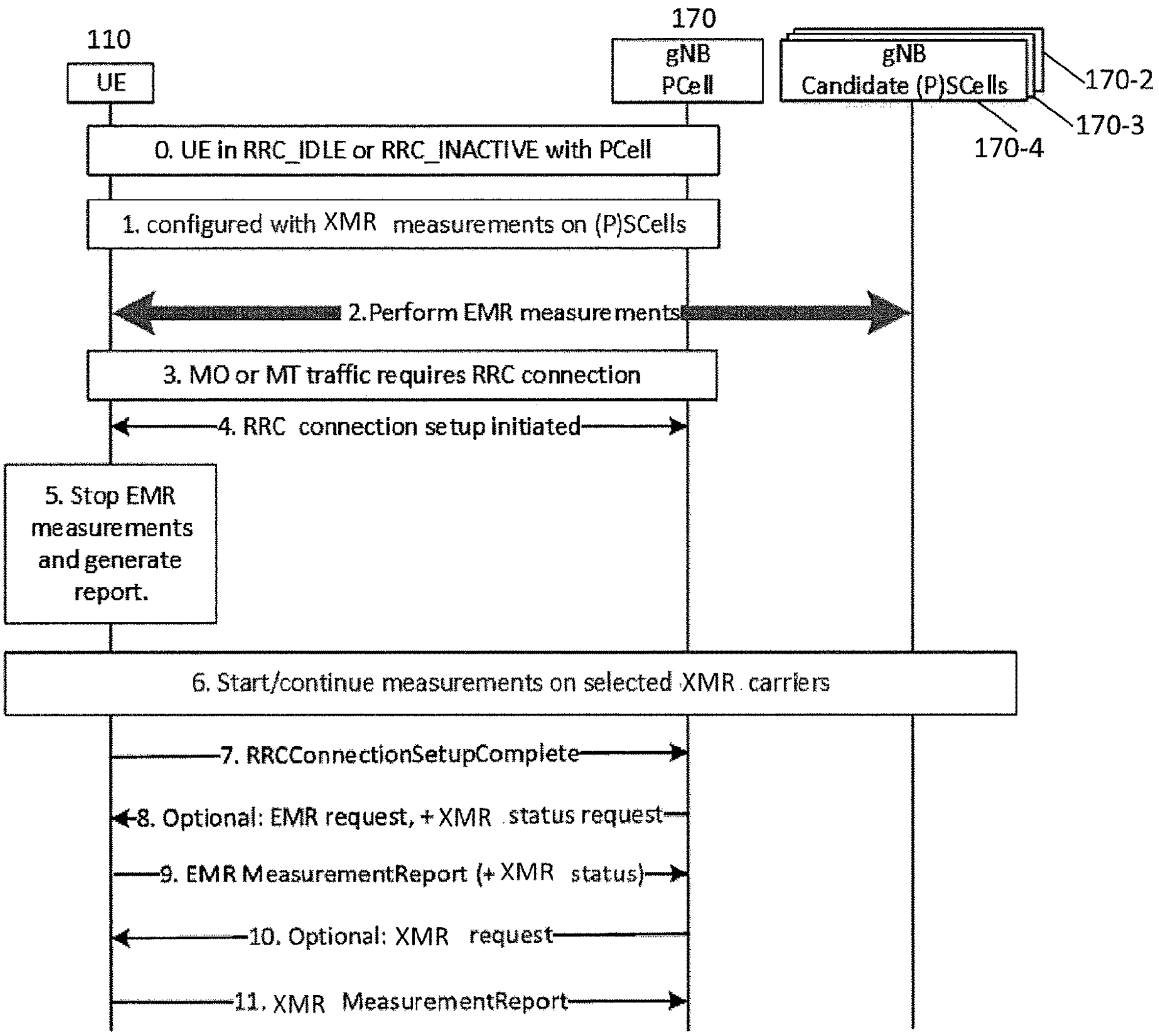
FIG. 4 shows a signaling message flow according to the enhancement described herein.

The example enhancement described herein is illustrated in FIG. 4. The steps are described below. Even though the different embodiments can be applied independently a combination of different alternatives cannot be excluded.

0. A UE supporting dual connectivity is in RRC_IDLE or RRC_INACTIVE state with its PCell.

1. The UE is configured with Early measurement reporting, including further enhancements (denoted XMR).

a. The configuration may be received at the UE in SIB or communicated by RRC signaling, for example RRCReleaseREquest or RRCSuspendREquest, when the UE is moved back to RRC_IDLE or RRC_INACTIVE from RRC_ CONNECTED state.

b. The configuration may include for example the carrier(s) to be measured in EMR (denoted EMR carriers) according to Rel. 16 and further specifies carrier(s) on which the UE should continue measurements at/after RRC connection setup (denoted XMR carriers). i. The XMR carriers may be the same as EMR carriers, may be a subset of EMR carriers, or may be different carrier(s) than EMR carriers. ii. The XMR carriers may be configured by gNB or selected by UE according to some selection criteria. In latter case the configuration may be only an indication from the NW to the UE that it shall continue measurements on selected carriers at/after connection setup.

Even though the different examples can be applied independently a combination of different alternatives cannot be excluded.

2. The UE performs EMR measurements as configured.

3. RRC connection needs to be initiated due to DL data or UL data arrival at NW or UE (mobile terminated (MT), or mobile originated (MO), call)

4. RRC connection setup procedure is started

5. UE stops measurements on EMR carriers and generates measurement report

6. UE starts to perform measurements on XMR carriers. a. Some or all of these carriers may be the same as EMR carriers. b. In one embodiment of any XMR carrier(s) being the same as EMR carrier(s), measurements only continue if the most recent EMR measurement is not fresh, e.g. the measurement is from more than a configured timer value.

7. RRC connection is established to PCell.

8. Optionally, the NW requests EMR measurement report as well as a status on XMR measurement status.

9. UE provides the EMR measurement report—right after RRC setup complete or as response to the received request—along with the XMR measurement status.

10. Optionally, the NW requests the XMR measurement report.

11. UE provides the XMR measurement report—right after the measurement is completed or as a response to the received request.

Figure 5:
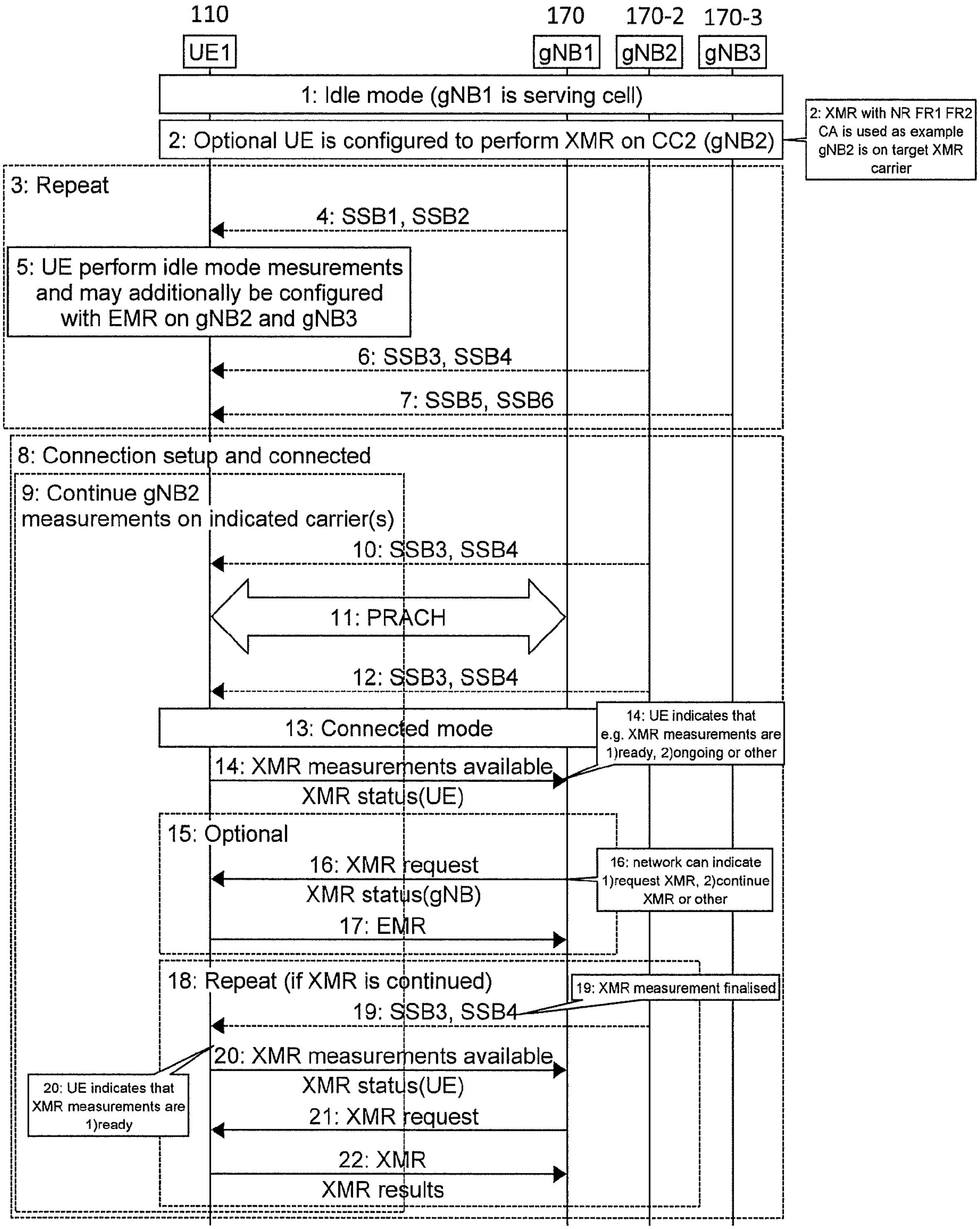
FIG. 5 shows an example signaling diagram illustrating the principle of the method described herein.

FIG. 5 illustrates another example of the principle of the method described herein. The example describes the principle of how the method could be carried out in the scenario where the UE may or may not be configured with EMR. Hence, this example also illustrates how the method can work independently from EMR. This example also illustrates how the method can enhance the beam level reporting e.g. in FR2 for UEs which are not capable of performing beam level measurements in idle/inactive mode. In the context of FIG. 5, XMR can refer to either existing EMR or another existing measurement reporting procedure.

Detailed description of the steps is given below:

1) in step 1 the UE is in idle or inactive mode performing measurements according to the measurement configuration.

2) The box in step 2 illustrates that the UE has been configured to initiate and perform measurement and/or measurement reporting upon connection setup. In this example the UE has been configured to do so on potential component carrier 2 (CC2). In one example the carrier CC2 may be a carrier configured for EMR. But it may also just be any carrier configured for idle or inactive mode measurements e.g. for mobility or load balancing.

3) Step 3 illustrates the measurements performed during idle or inactive modes. These measurements are performed based on the measurement configuration and configured purpose as described in step 1 and 2. Hence, the measurements are performed according to e.g. normal idle or inactive mode requirements or they may be performed according to EMR requirements. As illustrated the UE may be configured with EMR on CC2 and CC3 but it is not a prerequest. a. UE measures the carriers (here gNB1, gNB2 and gNB3 represents serving and neighbor detected cells on the carriers) and in particular SSB1, SSB2, SSB3, SSB4, SSB5 and SSB6.

4) At step 8 a connection setup is initiated ending up with UE entering connected mode. It is during this period and potentially a period of time while in connected mode, the UE initiates and perform measurements according to XMR.

a. When connection setup is initiated the UE continues any measurement performed on carriers indicated for XMR during the connection setup phase and possible during a period of time in connected mode.

b. In step 10 the UE continue the measurements on cell2 (gNB2) as configured according the network configuration (SSB3 and SSB4). Which carrier to continue to measure could be explicitly indicated, implicitly chosen based on predefined rules or could be chosen by the UE.

c. The UE continues these measurements (for potential target gNB2) during the connection setup phase including during e.g. random access procedure and setup signaling.

d. Especially for the case where UE has separate front end and/or receiver for operations in different frequency ranges the UE can perform the XMR without impact from or impacting the connection setup procedure. E.g. in the case where of EN-DC with PCell in FR1 and SCell in FR2.

e. The UE is assumed to measure each configured downlink (DL) reference signal (RS) as configured e.g. SSB, separately as is the current assumption and hence is able to provide the DL RS e.g. SSB detailed measurement results (also the UE which cannot measure on SSB level in idle mode).

f. Network may also configure the UE to detect the beam Index of the measured SSBs.

g. Once entering connected mode, the UE can indicate to the network that XMR measurements are available (step 14). i. In one example this indication may also include the actual measurement results. ii. In one example the indication may include the status of the XMR measurement procedure e.g. whether the results are ready, are not ready, ongoing or similar.

h. Step 15 is optional and used in case the network would need to request the XMR results from the UE or the XMR measurement status from the UE. E.g. in the case that the UE in step 16 indicates that the measurements are ongoing or ready, but the message does not include the actual results.

The UE may additionally indicate the report of EMR measurements as part step 17 via the legacy EMR procedure.

i. Step 18 is for the scenario where the XMR measurements continue. i. in step 19 the UE continues to measure the carrier(s) or cells indicated or selected for XMR. ii. In step 20, once the measurements are ready in UE side the UE indicates this to the network. iii. As in step 14 the message may include the actual measurement result or just an indication about the status. iv. In step 21 the network requests the results if not included in step 20. v. Step 22: the UE sends the XMR measurement report.

One benefit from this method is that it enables the UE to perform beam level measurements on a detected cell even if such measurements have not been performed in idle or inactive mode e.g. due to UE capability (UE cannot perform such beam level measurements) or UE was not configured to perform such measurements. This is because the UE is doing the measurements while transitioning to CONNECTED mode, which may be handled in the same way as CONNECTED, where the beam level measurements are mandatory.

Figure 6:
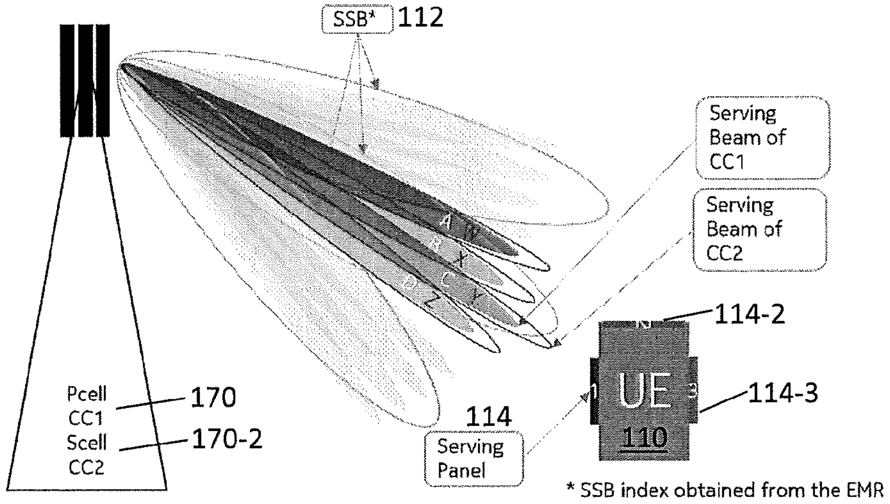
FIG. 6 is an illustration of beam level measurements.

Especially in the CA case, this is important as it enables faster activation of the SCell. This is illustrated in FIG. 6 where FR2 SCell 170-2 is assumed as one example.

In accordance with the XMR method, the UE 110 has been configured to perform XMR measurements on CC2

170-2 where the target SCell is located. In this example the SCell 170-2 is in FR2 and collocated with the PCell 170 which is in FR1. During idle mode UE 110 has detected and measured the target SCell 170-2 but has not performed any beam level measurement on the cell e.g. due to lack of UE 110 capability to do so or not being configured to do so.

Once the connection setup is initiated, the UE 110 performs XMR measurements (continue the idle mode measurements on e.g. indicated XMR carriers) during the connection setup. UE 110 performs beam level measurement and potentially beam Index reading of best beam(s)—in this case it could be the SSB containing beams 'A' to 'D' or it could simply be beam 'C'.

As UE 110 has already detected and measured the target SCell, the actual Index reading may be done by a single SSB 112 reception (if needed) which also updates the measurements. In some conditions more than one SSB reception would be needed. Once the XMR has been performed the UE 110 can report the results to the network which then knows which DL beam is the best and is the one on which to reach the UE—e.g. for scheduling the SCell once the SCell has been activated—or PDCCH order for initiating random access in case of PUCCH SCell activation.

As further shown in FIG. 6, the UE 110 comprises serving panels 114, 114-2, and 114-3.

The examples described herein may be part of the Rel-18 WI proposal on the topic of FR2-DCCA, and used potentially in RAN Plenary. The examples described herein may be provided in the 3GPP specifications, such as 38.331 and 38.133.

Figure 7:
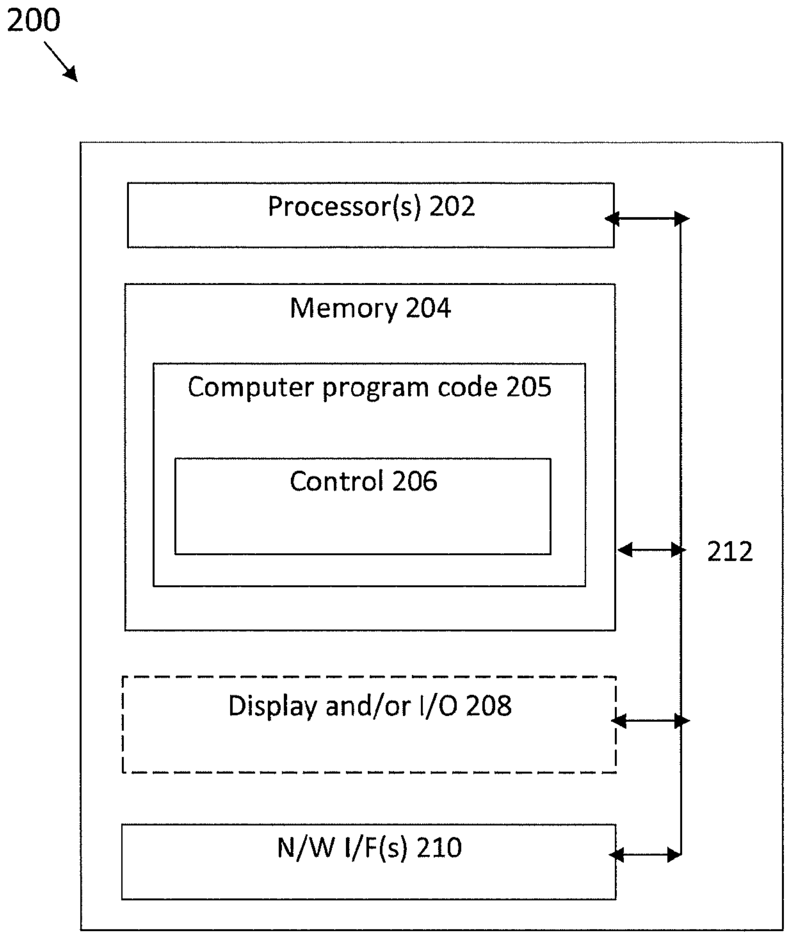
FIG. 7 is an example apparatus configured to implement expedited measurement reporting, based on the examples described herein.

FIG. 7 is an example apparatus 200, which may be implemented in hardware, configured to implement the examples described herein. The apparatus 200 comprises at least one processor 202 (an FPGA and/or CPU), at least one non-transitory or transitory memory 204 including computer program code 205, wherein at least one memory 204 and the computer program code 205 are configured to, with at least one processor 202, cause the apparatus 2700 to implement circuitry, a process, component, module, or function (collectively control 206) to implement expedited measurement reporting (XMR).

The apparatus 200 optionally includes a display and/or I/O interface 208 that may be used to display aspects or a status of the methods described herein (e.g., as one of the methods is being performed or at a subsequent time). The apparatus 200 includes one or more network (N/W) interfaces (I/F(s)) 210. The N/W I/F(s) 210 may be wired and/or wireless and communicate over the Internet/other network(s) via any communication technique. The N/W I/F(s) 210 may comprise one or more transmitters and one or more receivers. The N/W I/F(s) 210 may comprise standard well-known components such as an amplifier, filter, frequency-converter, (de)modulator, and encoder/decoder circuitries and one or more antennas.

The apparatus 200 to implement the functionality of control 206 may be UE 110, RAN node 170, or network element(s) 190. Thus, processor 202 may correspond respectively to processor(s) 120, processor(s) 152 and/or processor(s) 175, memory 204 may correspond respectively to memory(ies) 125, memory(ies) 155 and/or memory(ies) 171, computer program code 205 may correspond respectively to computer program code 123, module 140-1, module 140-2, and/or computer program code 153, module 150-1, module 150-2, and/or computer program code 173, and N/W I/F(s) 210 may correspond respectively to N/W I/F(s) 161 and/or N/W I/F(s) 180. Alternatively, apparatus 200 may not correspond to either of UE 110, RAN node 170, network element(s) 190, as apparatus 200 may be part of a self-organizing/optimizing network (SON) node, such as in a cloud. The apparatus 200 may also be distributed throughout the network 100 including within and between apparatus 200 and any one of the network element(s) (190) (such as a network control element (NCE)) and/or the RAN node 170 and/or the UE 110.

Interface 212 enables data communication between the various items of apparatus 200, as shown in FIG. 7. For example, the interface 212 may be one or more buses such as address, data, or control buses, and may include any interconnection mechanism, such as a series of lines on a motherboard or integrated circuit, fiber optics or other optical communication equipment, and the like. Computer program code 205, including control 206 may comprise object-oriented software configured to pass data/messages between objects within computer program code 205. The apparatus 200 need not comprise each of the features mentioned, or may comprise other features as well.

Figure 8:
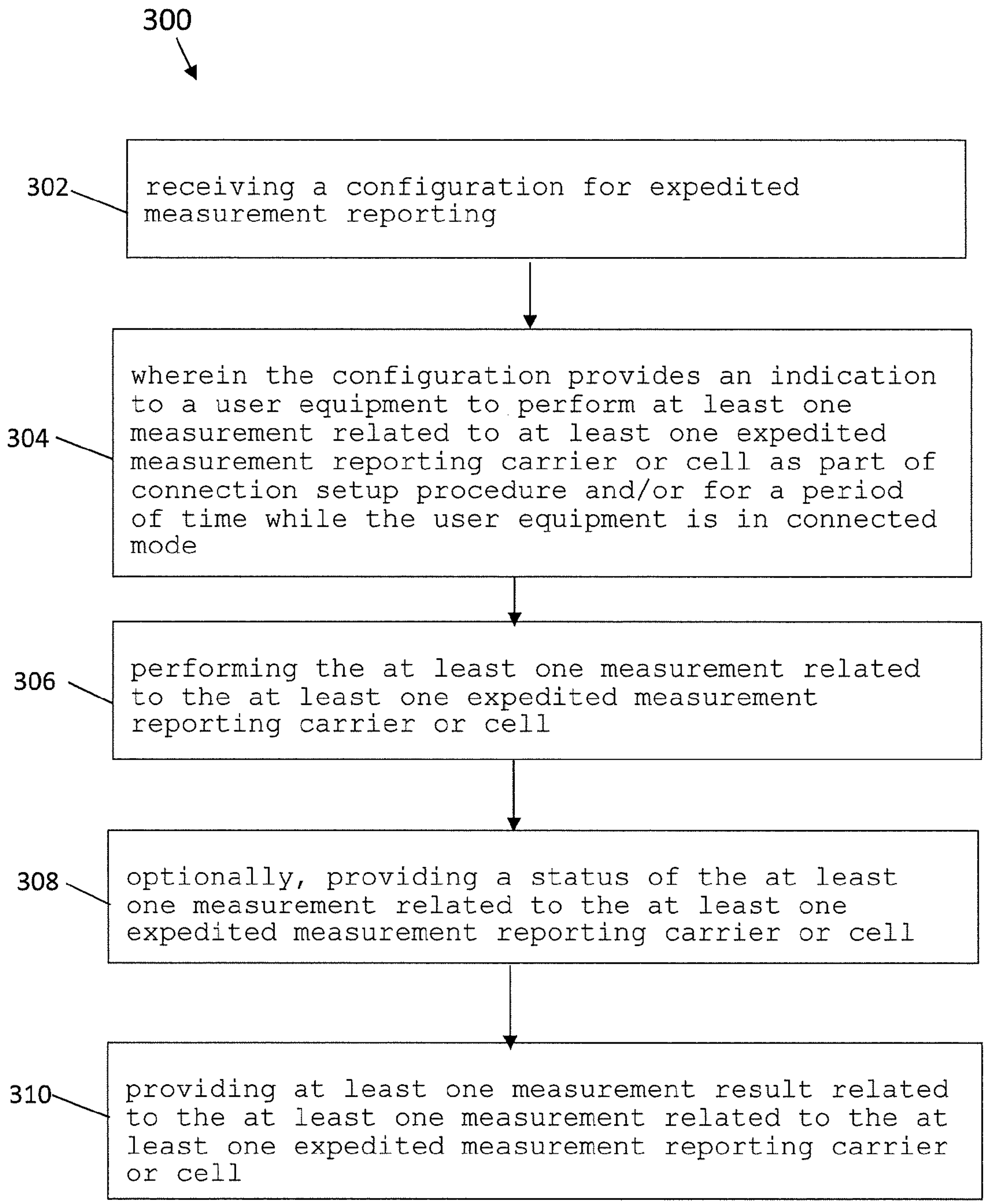
FIG. 8 is an example method to implement expedited measurement reporting, based on the examples described herein.

FIG. 8 is an example method 300 to implement expedited measurement reporting (XMR), based on the example embodiments described herein. At 302, the method includes receiving a configuration for expedited measurement reporting. At 304, the method includes wherein the configuration provides an indication to a user equipment to perform at least one measurement related to at least one expedited measurement reporting carrier or cell as part of connection setup procedure and/or for a period of time while the user equipment is in connected mode. At 306, the method includes performing the at least one measurement related to the at least one expedited measurement reporting carrier or cell. At 308, the method optionally includes providing a status of the at least one measurement related to the at least one expedited measurement reporting carrier or cell. At 310, the method includes providing at least one measurement result related to the at least one measurement related to the at least one expedited measurement reporting carrier or cell. Method 300 may be performed with UE 110, apparatus 200, or a combination of those.

Figure 9:
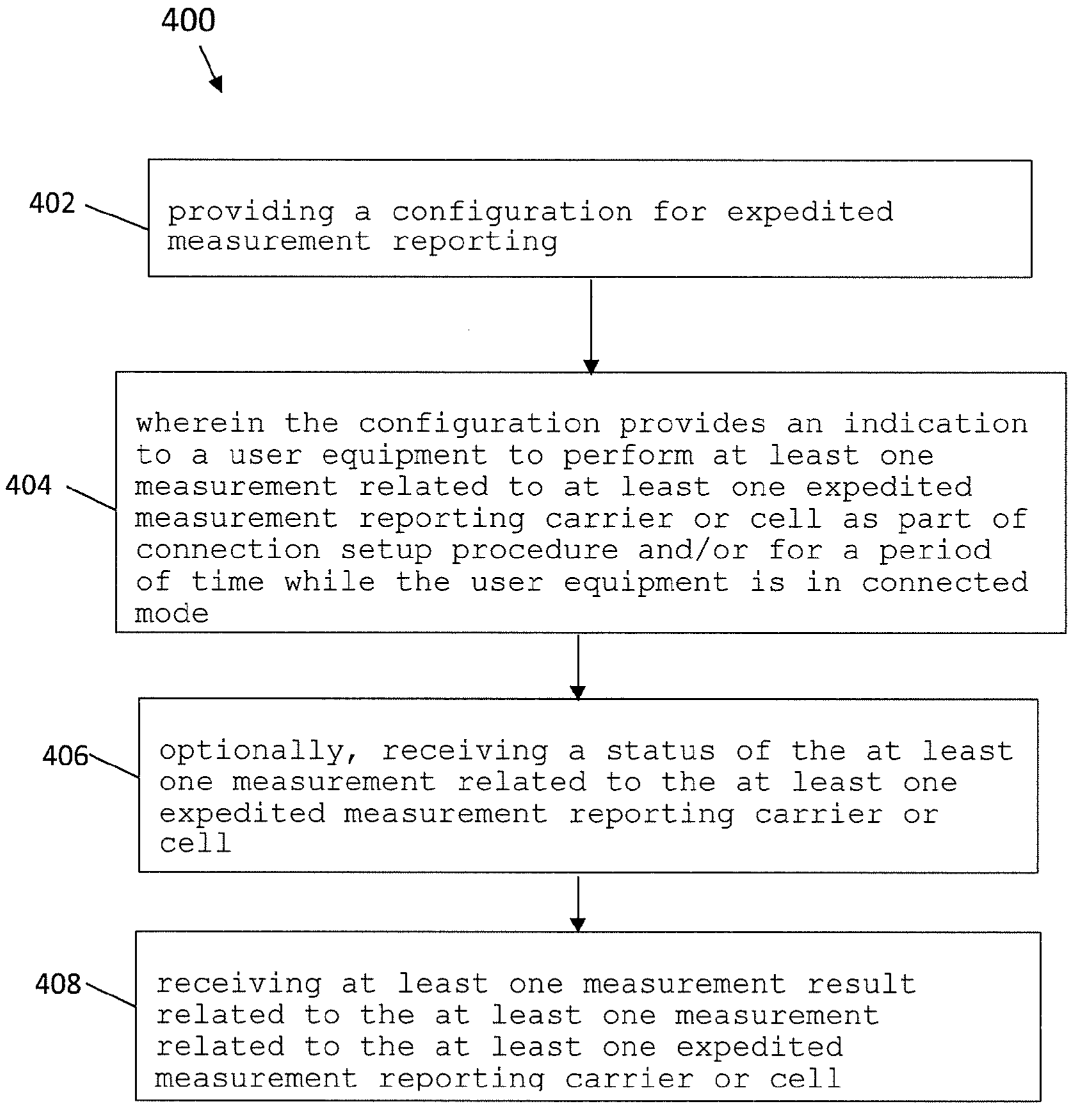
FIG. 9 is an example method to implement expedited measurement reporting, based on the examples described herein.

FIG. 9 is an example method 400 to implement expedited measurement reporting (XMR), based on the example embodiments described herein. At 402, the method includes providing a configuration for expedited measurement reporting. At 404, the method includes wherein the configuration provides an indication to a user equipment to perform at least one measurement related to at least one expedited measurement reporting carrier or cell as part of connection setup procedure and/or for a period of time while the user equipment is in connected mode. At 406, the method optionally includes receiving a status of the at least one measurement related to the at least one expedited measurement reporting carrier or cell. At 408, the method includes receiving at least one measurement result related to the at least one measurement related to the at least one expedited measurement reporting carrier or cell. Method 400 may be performed with gNB 170, apparatus 200, or a combination of those.

Figure 10:
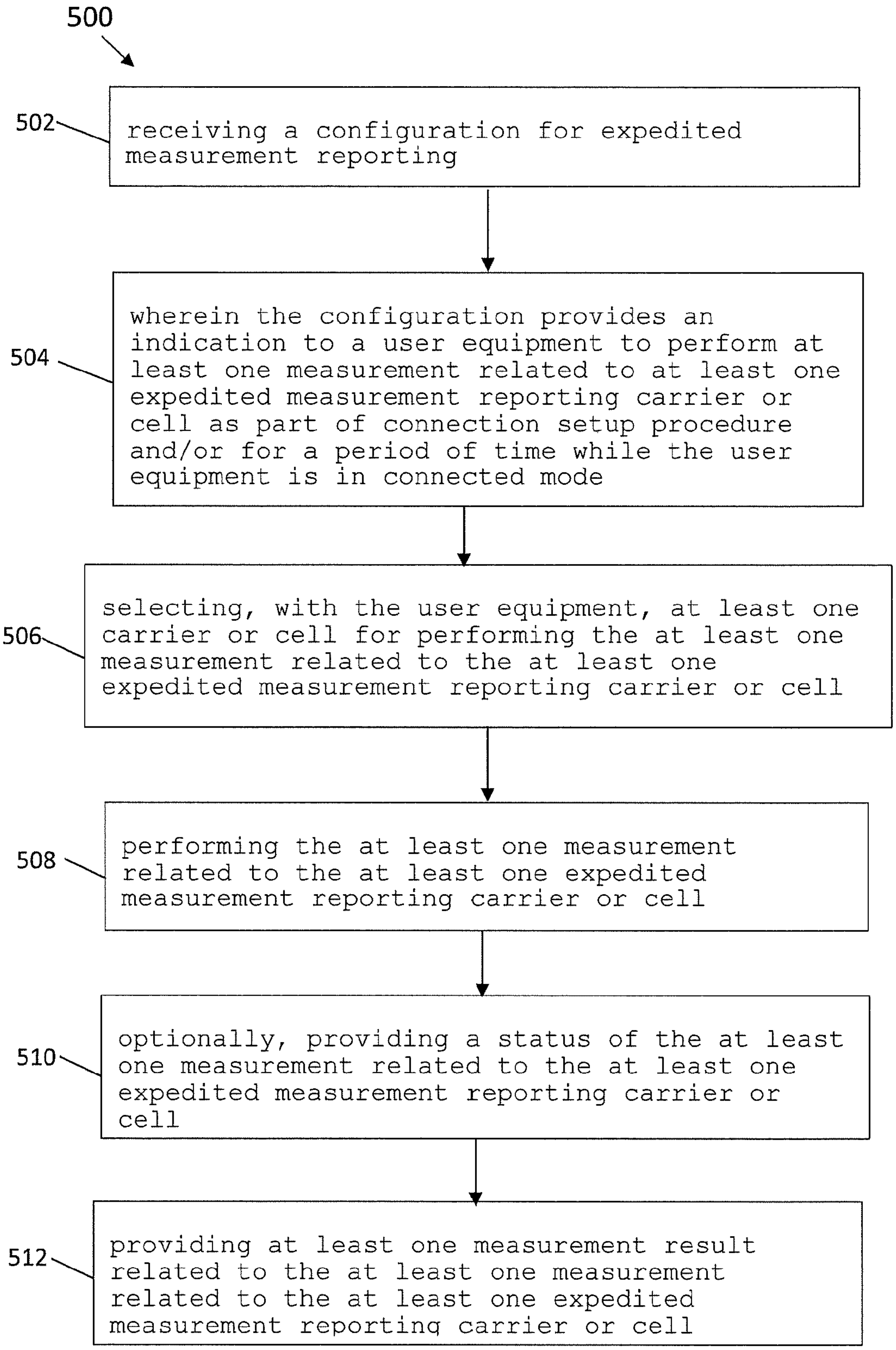
FIG. 10 is an example method to implement expedited measurement reporting, based on the examples described herein.

FIG. 10 is an example method 500 to implement expedited measurement reporting (XMR), based on the example embodiments described herein. At 502, the method includes receiving a configuration for expedited measurement reporting. At 504, the method includes wherein the configuration provides an indication to a user equipment to perform at least one measurement related to at least one expedited measurement reporting carrier or cell as part of connection setup procedure and/or for a period of time while the user equipment is in connected mode. At 506, the method includes selecting, with the user equipment, at least one carrier or cell for performing the at least one measurement related to the at least one expedited measurement reporting carrier or cell. At 508, the method includes performing the at least one measurement related to the at least one expedited measurement reporting carrier or cell. At 510, the method optionally includes providing a status of the at least one measurement related to the at least one expedited measurement reporting carrier or cell. At 512, the method includes providing at least one measurement result related to the at least one measurement related to the at least one expedited measurement reporting carrier or cell. Method 500 may be performed with UE 110, apparatus 200, or a combination of those.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example method includes receiving a configuration for expedited measurement reporting; wherein the configuration provides an indication to a user equipment to perform at least one measurement related to at least one expedited measurement reporting carrier or cell as part of connection setup procedure and/or for a period of time while the user equipment is in connected mode; performing the at least one measurement related to the at least one expedited measurement reporting carrier or cell; and providing at least one measurement result related to the at least one measurement related to the at least one expedited measurement reporting carrier or cell.

The method may further include wherein: the configuration is received in response to the user equipment being moved to a radio resource control idle state or a radio resource control inactive state; or the configuration is received with the user equipment in a system information block or with radio resource control signaling.

The method may further include wherein the at least one expedited measurement reporting carrier or cell is a carrier or cell for which the user equipment should continue measurement at/after a radio resource control connection setup.

The method may further include wherein the configuration indicates the at least one expedited measurement reporting carrier or cell for which the user equipment is to perform the at least one measurement related to the at least one expedited measurement reporting carrier or cell.

The method may further include wherein the at least one expedited measurement reporting carrier is either: at least one early measurement reporting carrier, a subset of the at least one early measurement reporting carrier, or different from the at least one early measurement reporting carrier.

The method may further include continuing to perform the at least one measurement related to the at least one expedited measurement reporting carrier or cell, in response to the at least one measurement related to the at least one expedited measurement reporting carrier or cell having been performed at a time that is greater than a threshold amount relative to a current time.

The method may further include wherein there is a time limit on how long after connection setup the user equipment continues one or more expedited measurement reporting measurements.

The method may further include receiving a request for a status of the at least one measurement related to the at least one expedited measurement reporting carrier or cell; and wherein the status of the at least one measurement related to the at least one expedited measurement reporting carrier or cell is provided in response to receiving the request.

The method may further include receiving a request for the at least one measurement result related to the at least one measurement related to the at least one expedited measurement reporting carrier or cell; and wherein the at least one measurement result related to the at least one measurement related to the at least one expedited measurement reporting carrier or cell is provided in response to receiving the request.

The method may further include wherein a status of the at least one measurement related to the at least one expedited measurement reporting carrier or cell is provided together with a measurement report related to at least one measurement for at least one early measurement reporting carrier.

The method may further include wherein: the configuration for expedited measurement reporting is received from a serving cell; and the at least one expedited measurement reporting carrier comprises the serving cell and at least one other candidate cell.

The method may further include wherein: the configuration indicates that, upon connection setup, the user equipment is configured to perform the at least one measurement related to the at least one expedited measurement reporting carrier or cell and to provide the at least one measurement result; and the at least one expedited measurement reporting carrier or cell is configured for early measurement reporting or for idle or inactive measurements.

The method may further include wherein the configuration indicates at least one early measurement reporting carrier for which the user equipment is to perform at least one measurement.

The method may further include wherein a network configures the user equipment via a 1-bit flag that indicates that the user equipment should perform additional measurements during/after the connection setup procedure based on the received configuration.

The method may further include wherein a network indicates one or more early measurement reporting carriers for which the user equipment is to perform expedited measurement reporting based on or as part of an early measurement reporting configuration.

The method may further include selecting, with the user equipment, at least one carrier or cell for performing the at least one measurement related to the at least one expedited measurement reporting carrier or cell.

The method may further include wherein a network indicates to the user equipment to perform the at least one measurement related to the at least one expedited measurement reporting carrier or cell without specifying a carrier or cell.

The method may further include wherein the selection is based on user equipment measurement availability or other user equipment autonomous selection.

The method may further include selecting, with the user equipment, a number of carriers based on measurement quality; and prioritizing the carriers which fulfill a quality criterion; or prioritizing the carriers for which one or more early measurement reporting measurements are older than a defined time less than early measurement reporting measurement periodicity.

The method may further include wherein the quality criterion comprises the measurement quality being greater than a threshold.

The method may further include providing a status of the at least one measurement related to the at least one expedited measurement reporting carrier or cell.

The method may further include providing a measurement report comprising the at least one measurement result.

The method may further include continuing to provide the at least one measurement result related to the at least one measurement related to the at least one expedited measurement reporting carrier or cell, in response to the at least one measurement related to the at least one expedited measurement reporting carrier or cell having been performed at a time that is greater than a threshold amount relative to a current time.

An example method includes providing a configuration for expedited measurement reporting; wherein the configuration provides an indication to a user equipment to perform at least one measurement related to at least one expedited measurement reporting carrier or cell as part of connection setup procedure and/or for a period of time while the user equipment is in connected mode; and receiving at least one measurement result related to the at least one measurement related to the at least one expedited measurement reporting carrier or cell.

The method may further include wherein: the configuration is provided in response to the user equipment being moved to a radio resource control idle state or a radio resource control inactive state; or the configuration is provided to the user equipment in a system information block or with radio resource control signaling.

The method may further include wherein the at least one expedited measurement reporting carrier or cell is a carrier or cell for which the user equipment should continue measurement at/after a radio resource control connection setup.

The method may further include wherein the configuration indicates the at least one expedited measurement reporting carrier or cell which the user equipment is to perform the at least one measurement related to the at least one expedited measurement reporting carrier or cell.

The method may further include wherein the at least one expedited measurement reporting carrier is either: at least one early measurement reporting carrier, a subset of the at least one early measurement reporting carrier, or different from the at least one early measurement reporting carrier.

The method may further include continuing to receive the at least one measurement result related to the at least one measurement related to the at least one expedited measurement reporting carrier or cell, in response to the at least one measurement related to the at least one expedited measurement reporting carrier or cell having been performed at a time that is greater than a threshold amount relative to a current time.

The method may further include wherein there is a time limit on how long after connection setup the user equipment continues one or more expedited measurement reporting measurements.

The method may further include providing a request for a status of the at least one measurement related to the at least one expedited measurement reporting carrier or cell; and wherein the status of the at least one measurement related to the at least one expedited measurement reporting carrier or cell is received in response to providing the request.

The method may further include providing a request for the at least one measurement result related to the at least one measurement related to the at least one expedited measurement reporting carrier or cell; and wherein the at least one measurement result related to the at least one measurement related to the at least one expedited measurement reporting carrier or cell is received in response to providing the request.

The method may further include wherein a status of the at least one measurement related to the at least one expedited measurement reporting carrier or cell is received together with a measurement report related to at least one measurement for at least one early measurement reporting carrier.

The method may further include wherein: the configuration for expedited measurement reporting is provided from a serving cell; and the at least one expedited measurement reporting carrier comprises the serving cell and at least one other candidate cell.

The method may further include wherein: the configuration indicates that, upon connection setup, the user equipment is configured to perform the at least one measurement related to the at least one expedited measurement reporting carrier or cell and to provide the at least one measurement result; and the at least one expedited measurement reporting carrier or cell is configured for early measurement reporting or for idle or inactive measurements.

The method may further include wherein the configuration indicates at least one early measurement reporting carrier for which the user equipment is to perform at least one measurement.

The method may further include configuring the user equipment via a 1-bit flag that indicates that the user equipment should perform additional measurements during/after the connection setup procedure based on the received configuration.

The method may further include indicating one or more early measurement reporting carriers for which the user equipment is to perform expedited measurement reporting based on or as part of an early measurement reporting configuration.

The method may further include wherein a network indicates to the user equipment to perform the at least one measurement related to the at least one expedited measurement reporting carrier or cell without specifying a carrier or cell.

The method may further include receiving a status of the at least one measurement related to the at least one expedited measurement reporting carrier or cell.

The method may further include receiving a measurement report comprising the at least one measurement result.

An example method includes receiving a configuration for expedited measurement reporting; wherein the configuration provides an indication to a user equipment to perform at least one measurement related to at least one expedited measurement reporting carrier or cell as part of connection setup procedure and/or for a period of time while the user equipment is in connected mode; selecting, with the user equipment, at least one carrier or cell for performing the at least one measurement related to the at least one expedited measurement reporting carrier or cell; performing the at least one measurement related to the at least one expedited measurement reporting carrier or cell; and providing at least one measurement result related to the at least one measurement related to the at least one expedited measurement reporting carrier or cell.

The method may further include wherein: the configuration is received in response to the user equipment being moved to a radio resource control idle state or a radio resource control inactive state; or the configuration is received with the user equipment in a system information block or with radio resource control signaling.

The method may further include wherein the at least one expedited measurement reporting carrier or cell is a carrier or cell for which the user equipment should continue measurement at/after a radio resource control connection setup.

The method may further include wherein the at least one expedited measurement reporting carrier is either: at least one early measurement reporting carrier, a subset of the at least one early measurement reporting carrier, or different from the at least one early measurement reporting carrier.

The method may further include continuing to perform the at least one measurement related to the at least one expedited measurement reporting carrier or cell, in response to the at least one measurement related to the at least one expedited measurement reporting carrier or cell having been performed at a time that is greater than a threshold amount relative to a current time.

The method may further include wherein there is a time limit on how long after connection setup the user equipment continues one or more expedited measurement reporting measurements.

The method may further include receiving a request for a status of the at least one measurement related to the at least one expedited measurement reporting carrier or cell; and wherein the status of the at least one measurement related to the at least one expedited measurement reporting carrier or cell is provided in response to receiving the request.

The method may further include receiving a request for the at least one measurement result related to the at least one measurement related to the at least one expedited measurement reporting carrier or cell; and wherein the at least one measurement result related to the at least one measurement related to the at least one expedited measurement reporting carrier or cell is provided in response to receiving the request.

The method may further include wherein a status of the at least one measurement related to the at least one expedited measurement reporting carrier or cell is provided together with a measurement report related to at least one measurement for at least one early measurement reporting carrier.

The method may further include wherein: the configuration for expedited measurement reporting is received from a serving cell; and the at least one expedited measurement reporting carrier comprises the serving cell and at least one other candidate cell.

The method may further include wherein: the configuration indicates that, upon connection setup, the user equipment is configured to perform the at least one measurement related to the at least one expedited measurement reporting carrier or cell and to provide the at least one measurement result; and the at least one expedited measurement reporting carrier or cell is configured for early measurement reporting or for idle or inactive measurements.

The method may further include wherein the configuration indicates at least one early measurement reporting carrier for which the user equipment is to perform at least one measurement.

The method may further include wherein a network configures the user equipment via a 1-bit flag that indicates that the user equipment should perform additional measurements during/after the connection setup procedure based on the received configuration.

The method may further include wherein a network indicates one or more early measurement reporting carriers for which the user equipment is to perform expedited measurement reporting based on or as part of an early measurement reporting configuration.

The method may further include wherein a network indicates to the user equipment to perform the at least one measurement related to the at least one expedited measurement reporting carrier or cell without specifying a carrier or cell.

The method may further include wherein the selection is based on user equipment measurement availability or other user equipment autonomous selection.

The method may further include selecting, with the user equipment, a number of carriers based on measurement quality; and prioritizing the carriers which fulfill a quality criterion; or prioritizing the carriers for which one or more early measurement reporting measurements are older than a defined time less than early measurement reporting measurement periodicity.

The method may further include wherein the quality criterion comprises the measurement quality being greater than a threshold.

The method may further include providing a status of the at least one measurement related to the at least one expedited measurement reporting carrier or cell.

The method may further include providing a measurement report comprising the at least one measurement result.

The method may further include continuing to provide the at least one measurement result related to the at least one measurement related to the at least one expedited measurement reporting carrier or cell, in response to the at least one measurement related to the at least one expedited measurement reporting carrier or cell having been performed at a time that is greater than a threshold amount relative to a current time.

An example apparatus includes at least one processor; and at least one non-transitory memory including computer program code; wherein the at least one memory and the computer program code are configured to, with the at least one processor, cause the apparatus at least to: receive a configuration for expedited measurement reporting; wherein the configuration provides an indication to a user equipment to perform at least one measurement related to at least one expedited measurement reporting carrier or cell as part of connection setup procedure and/or for a period of time while the user equipment is in connected mode; perform the at least one measurement related to the at least one expedited measurement reporting carrier or cell; and provide at least one measurement result related to the at least one measurement related to the at least one expedited measurement reporting carrier or cell.

An example apparatus includes at least one processor; and at least one non-transitory memory including computer program code; wherein the at least one memory and the computer program code are configured to, with the at least one processor, cause the apparatus at least to: provide a configuration for expedited measurement reporting; wherein the configuration provides an indication to a user equipment to perform at least one measurement related to at least one expedited measurement reporting carrier or cell as part of connection setup procedure and/or for a period of time while the user equipment is in connected mode; and receive at least one measurement result related to the at least one measurement related to the at least one expedited measurement reporting carrier or cell.

An example apparatus includes at least one processor; and at least one non-transitory memory including computer program code; wherein the at least one memory and the computer program code are configured to, with the at least one processor, cause the apparatus at least to: receive a configuration for expedited measurement reporting; wherein the configuration provides an indication to a user equipment to perform at least one measurement related to at least one expedited measurement reporting carrier or cell as part of connection setup procedure and/or for a period of time while the user equipment is in connected mode; select, with the user equipment, at least one carrier or cell for performing the at least one measurement related to the at least one expedited measurement reporting carrier or cell; perform the at least one measurement related to the at least one expedited measurement reporting carrier or cell; and provide at least one measurement result related to the at least one measurement related to the at least one expedited measurement reporting carrier or cell.

An example apparatus includes means for receiving a configuration for expedited measurement reporting; means for wherein the configuration provides an indication to a user equipment to perform at least one measurement related to at least one expedited measurement reporting carrier or cell as part of connection setup procedure and/or for a period of time while the user equipment is in connected mode; means for performing the at least one measurement related to the at least one expedited measurement reporting carrier or cell; and means for providing at least one measurement result related to the at least one measurement related to the at least one expedited measurement reporting carrier or cell.

An example apparatus includes means for providing a configuration for expedited measurement reporting; wherein the configuration provides an indication to a user equipment to perform at least one measurement related to at least one expedited measurement reporting carrier or cell as part of connection setup procedure and/or for a period of time while the user equipment is in connected mode; and means for receiving at least one measurement result related to the at least one measurement related to the at least one expedited measurement reporting carrier or cell.

An example apparatus includes means for receiving a configuration for expedited measurement reporting; wherein the configuration provides an indication to a user equipment to perform at least one measurement related to at least one expedited measurement reporting carrier or cell as part of connection setup procedure and/or for a period of time while the user equipment is in connected mode; means for selecting, with the user equipment, at least one carrier or cell for performing the at least one measurement related to the at least one expedited measurement reporting carrier or cell; means for performing the at least one measurement related to the at least one expedited measurement reporting carrier or cell; and means for providing at least one measurement result related to the at least one measurement related to the at least one expedited measurement reporting carrier or cell.

An example non-transitory program storage device readable by a machine, tangibly embodying a program of instructions executable with the machine for performing operations is provided, the operations comprising: receiving a configuration for expedited measurement reporting; wherein the configuration provides an indication to a user equipment to perform at least one measurement related to at least one expedited measurement reporting carrier or cell as part of connection setup procedure and/or for a period of time while the user equipment is in connected mode; performing the at least one measurement related to the at least one expedited measurement reporting carrier or cell; and providing at least one measurement result related to the at least one measurement related to the at least one expedited measurement reporting carrier or cell.

An example non-transitory program storage device readable by a machine, tangibly embodying a program of instructions executable with the machine for performing operations is provided, the operations comprising: providing a configuration for expedited measurement reporting; wherein the configuration provides an indication to a user equipment to perform at least one measurement related to at least one expedited measurement reporting carrier or cell as part of connection setup procedure and/or for a period of time while the user equipment is in connected mode; and receiving at least one measurement result related to the at least one measurement related to the at least one expedited measurement reporting carrier or cell.

An example non-transitory program storage device readable by a machine, tangibly embodying a program of instructions executable with the machine for performing operations is provided, the operations comprising: receiving a configuration for expedited measurement reporting; wherein the configuration provides an indication to a user equipment to perform at least one measurement related to at least one expedited measurement reporting carrier or cell as part of connection setup procedure and/or for a period of time while the user equipment is in connected mode; selecting, with the user equipment, at least one carrier or cell for performing the at least one measurement related to the at least one expedited measurement reporting carrier or cell; performing the at least one measurement related to the at least one expedited measurement reporting carrier or cell; and providing at least one measurement result related to the at least one measurement related to the at least one expedited measurement reporting carrier or cell.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

When a reference number as used herein is of the form y-x, this means that the referred to item is an instantiation of (or type of) reference number y. For example, item 170-2 in FIG. 4 is an instantiation of (e.g. a 2nd instantiation) of the gNB 170 shown in FIG. 1.

The following acronyms and abbreviations that may be found in the specification and/or the drawing figures are defined as follows:

3GPP third generation partnership project
4G fourth generation
5G fifth generation
5GC 5G core network
AMF access and mobility management function
ASIC application-specific integrated circuit
CA carrier aggregation
CC component carrier
CPU central processing unit
CU central unit or centralized unit
DC dual connectivity
DL downlink
DSP digital signal processor
DU distributed unit
EMR early measurement reporting
eNB evolved Node B (e.g., an LTE base station)
EN-DC E-UTRA-NR dual connectivity
en-gNB node providing NR user plane and control plane protocol terminations towards the UE, and acting as a secondary node in EN-DC
E-UTRA evolved universal terrestrial radio access, i.e., the LTE radio access technology
F1 control interface between the CU and the DU
FPGA field-programmable gate array
FR frequency range e.g. FR1 and FR2
gNB base station for 5G/NR, i.e., a node providing NR user plane and control plane protocol terminations towards the UE, and connected via the NG interface to the 5GC
I/F interface
I/O input/output
LMF location management function
LTE long term evolution (4G)
MAC medium access control
MME mobility management entity
MO mobile originated
MT mobile terminated
NCE network control element
ng or NG new generation
ng-eNB new generation eNB
NG-RAN new generation radio access network
NR new radio (5G)
N/W or NW network
PBCH physical broadcast channel
PCell or Pcell primary cell
PDA personal digital assistant
PDCCH physical downlink control channel
PDCP packet data convergence protocol
PHY physical layer
PUCCH physical uplink control channel
RAN radio access network
Rel-release
RLC radio link control
RRC radio resource control (protocol)
RRH remote radio head
RSRP reference signal receive power
RU radio unit
Rx receiver or reception
SCell or Scell secondary cell
SGW serving gateway
SIB system information block (e.g. SIB4 or SIB11)
SMTC SS/PBCH block measurement timing configuration
SON self-organizing/optimizing network
SS synchronization signal
SSB synchronization signal block, or SS/PBCH
TRP transmission and/or reception point
Tx transmitter or transmission
UE user equipment (e.g., a wireless, typically mobile device)
UPF user plane function
X2 network interface between RAN nodes and between RAN and the core network
XMR expedited measurement reporting
Xn network interface between NG-RAN nodes

What is claimed is:

1. A method comprising:

receiving a configuration for expedited measurement reporting;

wherein the configuration provides an indication to a user equipment to perform at least one measurement related to at least one expedited measurement reporting carrier or cell as part of connection setup procedure and for a period of time while the user equipment is in connected mode, wherein the at least one expedited measurement reporting carrier or cell is a carrier or cell for which the user equipment should continue measurement at/after a radio resource control connection setup;

upon initiation of the connection setup procedure, stopping early measurement reporting measurements and generating an early measurement reporting measurement report;

performing the at least one measurement related to the at least one expedited measurement reporting carrier or cell starting during the connection setup procedure and continuing for the period of time while the user equipment is in connected mode; and providing at least one measurement result related to the at least one measurement related to the at least one expedited measurement reporting carrier or cell.

2. The method of claim 1, wherein:

the configuration is received in response to the user equipment being moved to a radio resource control idle state or a radio resource control inactive state; or the configuration is received by the user equipment in a system information block or with radio resource control signaling, wherein the configuration indicates the at least one expedited measurement reporting carrier or cell for which the user equipment is to perform the at least one measurement related to the at least one expedited measurement reporting carrier or cell, wherein the at least one expedited measurement reporting carrier is either: at least one early measurement reporting carrier, a subset of the at least one early measurement reporting carrier, or different from the at least one early measurement reporting carrier.

3. The method of claim 1, further comprising continuing to perform the at least one measurement related to the at least one expedited measurement reporting carrier or cell, in response to the at least one measurement related to the at least one expedited measurement reporting carrier or cell having been performed at a time that is greater than a threshold amount relative to a current time.

4. The method of claim 1, wherein there is a time limit on how long after connection setup the user equipment continues one or more expedited measurement reporting measurements.

5. The method of claim 1, further comprising:
receiving a request for a status of the at least one measurement related to the at least one expedited measurement reporting carrier or cell; and
wherein the status of the at least one measurement related to the at least one expedited measurement reporting carrier or cell is provided in response to receiving the request.

6. The method of claim 1, further comprising:
receiving a request for the at least one measurement result related to the at least one measurement related to the at least one expedited measurement reporting carrier or cell; and
wherein the at least one measurement result related to the at least one measurement related to the at least one expedited measurement reporting carrier or cell is provided in response to receiving the request,
wherein a status of the at least one measurement related to the at least one expedited measurement reporting carrier or cell is provided together with a measurement report related to at least one measurement for at least one early measurement reporting carrier,
wherein:
the configuration for expedited measurement reporting is received from a serving cell; and
the at least one expedited measurement reporting carrier comprises the serving cell and at least one other candidate cell.

7. The method of claim 1, wherein:
the configuration indicates that, upon connection setup, the user equipment is configured to perform the at least one measurement related to the at least one expedited measurement reporting carrier or cell and to provide the at least one measurement result; and
the at least one expedited measurement reporting carrier or cell is configured for early measurement reporting or for idle or inactive measurements,
wherein the user equipment is configured via a 1-bit flag that indicates that the user equipment should perform additional measurements during/after the connection setup procedure based on the received configuration, and
wherein the user equipment is configured with one or more early measurement reporting carriers for which the user equipment is to perform expedited measurement reporting based on or as part of an early measurement reporting configuration.

8. The method of claim 1, wherein the configuration indicates at least one early measurement reporting carrier for which the user equipment is to perform at least one measurement.

9. The method of claim 1, further comprising selecting, by the user equipment, at least one carrier or cell for performing the at least one measurement related to the at least one expedited measurement reporting carrier or cell.

10. The method of claim 1, further comprising:
selecting, by the user equipment, a number of carriers based on measurement quality; and
prioritizing the carriers which fulfill a quality criterion; or
prioritizing the carriers for which one or more early measurement reporting measurements are older than a defined time less than early measurement reporting measurement periodicity.

11. A method comprising:
providing a configuration for expedited measurement reporting;
wherein the configuration provides an indication to a user equipment to perform at least one measurement related to at least one expedited measurement reporting carrier or cell as part of connection setup procedure and for a period of time while the user equipment is in connected mode, wherein the at least one expedited measurement reporting carrier or cell is a carrier or cell for which the user equipment should continue measurement at/after a radio resource control connection setup;
receiving a status of the at least one measurement related to the at least one expedited measurement reporting carrier or cell, wherein the status indicates whether results of an expedited measurement reporting measurement procedure are ready, not ready, or ongoing; and
receiving at least one measurement result related to the at least one measurement related to the at least one expedited measurement reporting carrier or cell,
wherein:
the configuration is provided in response to the user equipment being moved to a radio resource control idle state or a radio resource control inactive state; or
the configuration is provided to the user equipment in a system information block or with radio resource control signaling.

12. An apparatus comprising:
at least one processor; and
at least one non-transitory memory including computer program code;
wherein the at least one memory and the computer program code are configured to, with the at least one processor, cause the apparatus at least to:
receive a configuration for expedited measurement reporting;
wherein the configuration provides an indication to a user equipment to perform at least one measurement related to at least one expedited measurement reporting carrier or cell as part of connection setup procedure and for a period of time while the user equipment is in connected mode, wherein the at least one expedited measurement reporting carrier or cell is a carrier or cell for which the user equipment should continue measurement at/after a radio resource control connection setup;
select, with the user equipment, at least one carrier or cell for performing the at least one measurement related to the at least one expedited measurement reporting carrier or cell;
upon initiation of the connection setup procedure, stop early measurement reporting measurements and generate an early measurement reporting measurement report;
perform the at least one measurement related to the at least one expedited measurement reporting carrier or cell starting during the connection setup procedure and continuing for the period of time while the user equipment is in connected mode; and
provide at least one measurement result related to the at least one measurement related to the at least one expedited measurement reporting carrier or cell.

13. The apparatus of claim 12, wherein the at least one memory and the computer program code are further configured to, with the at least one processor, cause the apparatus at least to perform beam level measurements on a detected cell during the connection setup procedure, wherein the beam level measurements were not performed while the user equipment was in an idle or inactive mode due to a lack of user equipment capability to perform beam level measurements in idle or inactive mode, and wherein the apparatus detects a beam index of measured synchronization signal blocks during the connection setup procedure.

14. The apparatus of claim 13, wherein the beam index of the measured synchronization signal blocks is obtained by a single synchronization signal block reception that also updates measurements on the detected cell.

15. The apparatus of claim 12, wherein the apparatus has a separate front end or receiver for operations in different frequency ranges, and the apparatus performs the at least one measurement related to the at least one expedited measurement reporting carrier or cell without impact from or impacting the connection setup procedure.

16. The apparatus of claim 12, wherein the configuration for expedited measurement reporting is received via at least one of: a paging message, a stored configuration, or during the connection setup as part of a random access response.

17. The apparatus of claim 12, wherein the at least one memory and the computer program code are further configured to, with the at least one processor, cause the apparatus at least to, upon initiation of the connection setup procedure, stop early measurement reporting measurements and generate an early measurement reporting measurement report, and start the at least one measurement related to the at least one expedited measurement reporting carrier or cell on one or more carriers operating in a frequency range above 24.25 GHZ.

18. The apparatus of claim 17, wherein the at least one memory and the computer program code are further configured to, with the at least one processor, cause the apparatus at least to provide results based on both early measurement reporting and a one-sample expedited measurement reporting measurement on selected carriers performed during the connection setup procedure or while in connected mode, wherein the results are reported via existing early measurement reporting if the results are ready, or at a later point once the results are ready.

19. The apparatus of claim 12, wherein the at least one memory and the computer program code are further configured to, with the at least one processor, cause the apparatus at least to:

perform beam level measurements on a detected cell during the connection setup procedure, wherein the beam level measurements were not performed while the user equipment was in an idle or inactive mode due to a lack of user equipment capability to perform beam level measurements in idle or inactive mode, and wherein the apparatus detects a beam index of measured synchronization signal blocks during the connection setup procedure, and wherein the beam index is obtained by a single synchronization signal block reception that also updates measurements on the detected cell, wherein the apparatus has a separate front end or receiver for operations in different frequency ranges, and the apparatus performs the at least one measurement related to the at least one expedited measurement reporting carrier or cell without impact from or impacting the connection setup procedure;

upon initiation of the connection setup procedure, stop early measurement reporting measurements and generate an early measurement reporting measurement report, and start the at least one measurement related to the at least one expedited measurement reporting carrier or cell on one or more carriers operating in a frequency range above 24.25 GHZ;

indicate to a network that the at least one measurement related to the at least one expedited measurement reporting carrier or cell is available, wherein the indication includes a status of an expedited measurement reporting measurement procedure indicating whether results are ready, not ready, or ongoing, and wherein the indication includes actual measurement results; and provide results based on both early measurement reporting and a one-sample expedited measurement reporting measurement on selected carriers performed during the connection setup procedure or while in connected mode, wherein the results are reported via existing early measurement reporting if the results are ready, or at a later point once the results are ready.

20. The apparatus of claim 12, wherein the at least one memory and the computer program code are further configured to, with the at least one processor, cause the apparatus at least to receive from a network an instruction to request expedited measurement reporting or to continue expedited measurement reporting.

* * * * *